No. 860,423.  
PATENTED JULY 16, 1907.

L. L. TACKITT.  
FENDER.  
APPLICATION FILED FEB. 19, 1907.

Witnesses  
G. R. Thomas  
M. O. Bowling

Inventor  
L. L. Tackitt  
By Swift &C.  
Attorneys

UNITED STATES PATENT OFFICE.

LEWIS L. TACKITT, OF BUSCH, OKLAHOMA TERRITORY.

FENDER.

No. 860,423.　　　Specification of Letters Patent.　　　Patented July 16, 1907.

Application filed February 19, 1907. Serial No. 358,269.

*To all whom it may concern:*

Be it known that I, LEWIS L. TACKITT, a citizen of the United States, residing at Busch, in the Territory of Oklahoma, have invented a new and useful Fender;
and I do hereby declare the following to be a full, clear, and exact description of the invention, such as will enable others skilled in the art to which it appertains to make and use the same.

The invention relates to fenders, for cars, trucks and similar heavy vehicles.

The object of the invention is to provide a novel device of strong, durable and inexpensive construction which will throw a person or other object out of its track thus preventing them from being run over.
It is more particularly intended that this invention be applied to trucks in which case, they will not extend the entire length of the car but only as a guard on the trucks.

With these and other objects in view, the invention consists in the novel construction and arrangement of parts, hereinafter described and shown and particularly pointed out in the appended claims.

Figure 1:
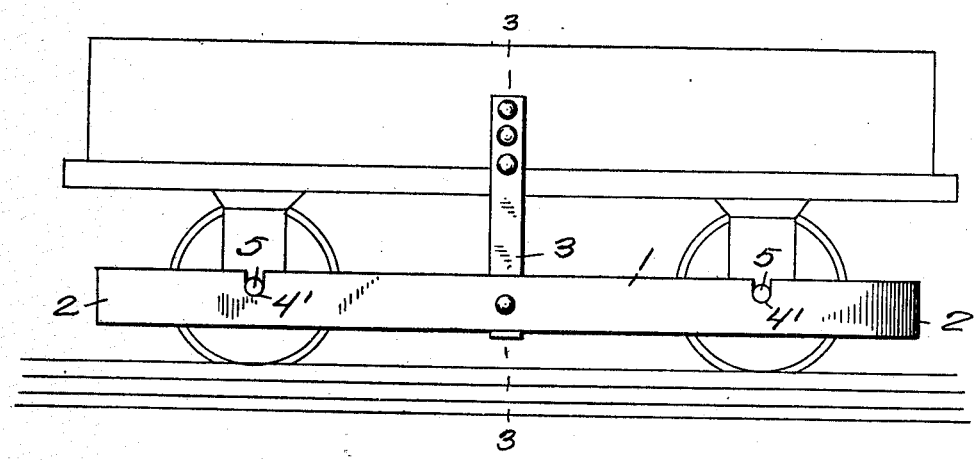
Figure 2:
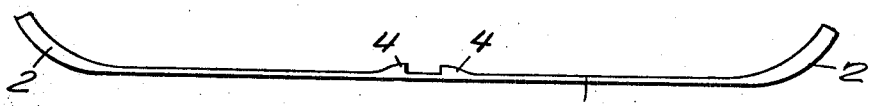
Figure 3:

In the drawings, Figure 1 is a side elevation of a fender constructed in accordance with this invention and shown applied to a truck. Fig. 2 is a plan view of the fender. Fig. 3 is a vertical sectional view through the depending arm.

Referring to the drawings, 1 designates the central portion of my fender which is provided with curved ends 2. The fender is mounted on the side of the car as shown, and extends forwardly and rearwardly of the truck wheels, the curved portions 2 being adapted to throw anything out of its path, thus preventing the wheels from running over the same. It is understood of course, that these fenders are mounted one on each side of the truck.

The main support of the fender is a depending L-shaped arm 3 which extends from the body of the truck to the bottom of the fender. On each side of the arm 3, are shoulders 4, which prevent the fender from being broken when it strikes a heavy object. On either end of the arm 3, are recesses 4', which are engaged by suitable projections 5, which, coöperating with the arm 3 hold the fender in a rigid position at all times. It is understood of course, that the fender will be made of various thicknesses according to the size of the device to which it is to be attached. And I desire it to be understood, changes in the form, proportion and minor details of construction may be resorted to, without departing from the spirit of this invention.

What is claimed is:

1. The combination of a truck, having a depending L-shaped arm, a fender secured thereto and extending longitudinally of said truck and having each end curved inwardly, recesses formed in each end of said fender, and projections mounted on said truck and engaging said recesses, substantially as described.

2. The combination of a truck, having a depending L-shaped arm, a fender secured thereto and having both ends curved inwardly, substantially as described.

In testimony whereof I have signed my name to this specification in the presence of two subscribing witnesses.

LEWIS L. TACKITT.

Witnesses:
　J. A. MOON,
　R. B. YADON.